(12) United States Patent
Kuwazoe

(10) Patent No.: US 9,055,229 B2
(45) Date of Patent: Jun. 9, 2015

(54) CONTROL CIRCUIT, CONTROL METHOD OF CONTROL CIRCUIT, AND IMAGING DEVICE

(71) Applicant: Sony Corporation, Tokyo (JP)

(72) Inventor: Yasuyoshi Kuwazoe, Chiba (JP)

(73) Assignee: SONY CORPORATION, Tokyo (JP)

( * ) Notice: Subject to any disclaimer, the term of this patent is extended or adjusted under 35 U.S.C. 154(b) by 245 days.

(21) Appl. No.: 13/865,470

(22) Filed: Apr. 18, 2013

(65) Prior Publication Data

US 2013/0335607 A1 Dec. 19, 2013

(30) Foreign Application Priority Data

Jun. 18, 2012 (JP) ................................. 2012-136493

(51) Int. Cl.
*H04N 5/376* (2011.01)
*H04N 5/235* (2006.01)

(52) U.S. Cl.
CPC ........... *H04N 5/2353* (2013.01); *H04N 5/3765* (2013.01)

(58) Field of Classification Search
CPC ........................... H04N 5/2353; H04N 5/3765

USPC ................................................ 348/221.1, 312
See application file for complete search history.

(56) References Cited

U.S. PATENT DOCUMENTS 5,638,120 A * 6/1997 Mochizuki et al. ........... 348/296
2012/0026374 A1* 2/2012 Kido ............................. 348/332

* cited by examiner

*Primary Examiner* — Nelson D. Hernández Hernández
(74) *Attorney, Agent, or Firm* — Oblon, McClelland, Maier & Neustadt, L.L.P.

(57) ABSTRACT

To be provided is a control circuit including a horizontal synchronization clock counting unit that counts the number of clock cycles of a horizontal synchronization clock signal for instructing a timing of starting scanning pixels in a horizontal direction of a pixel group arranged in a two-dimensional lattice shape, so as to be used as a horizontal synchronization clock count value, a high frequency clock counting unit that counts the number of clock cycles of a high frequency clock signal with a higher frequency than the horizontal synchronization clock signal, so as to be used as a high frequency clock count value, and a timing determination unit that determines timings of starting and ending exposure for the pixels on the basis of the horizontal synchronization clock count value and the high frequency clock count value.

8 Claims, 13 Drawing Sheets

CONTROL CIRCUIT, CONTROL METHOD OF CONTROL CIRCUIT, AND IMAGING DEVICE

BACKGROUND

The present technology relates to a control circuit, an exposure control method, and an imaging device. Specifically, the present technology relates to a control circuit, an exposure control method, and an imaging device, which control an exposure time during imaging.

In the related art, in an imaging apparatus, a process of controlling an exposure time to a value set in advance when imaging is performed. In the control of an exposure time, an imaging apparatus has been proposed which controls start and end timings of the exposure time in synchronization with a vertical synchronization clock signal and a horizontal synchronization clock signal (for example, refer to Japanese Unexamined Patent Application Publication No. 2009-49870). Here, the vertical synchronization clock signal is a signal for instructing a timing of starting scanning an image, and may be generated by software. The horizontal synchronization clock signal is a clock signal for instructing a timing of starting scanning each row in the image, and is generated by an oscillation circuit or the like.

In a case of using the vertical synchronization clock signal and the horizontal synchronization clock signal, the imaging apparatus sets, for example, an exposure start row and an exposure end row, starts the exposure in the exposure start row of a certain image, and ends the exposure in the exposure end row of the next image. In other words, the imaging apparatus controls timings of starting and ending exposure in rows specified by the vertical synchronization clock signal and the horizontal synchronization clock signal.

SUMMARY

In the above-described technique in the related art, it is difficult to control an exposure time with high accuracy. The vertical synchronization clock signal generally has a greater allowable error than the horizontal synchronization clock signal, and, for example, an error of several tens of microseconds (µs) to 100 microseconds is allowed. In a case where the imaging apparatus generates the vertical synchronization clock signal within the allowable error range by using software, a period of the vertical synchronization clock signal varies in a range from several tens of microseconds (µs) to 100 microseconds. In addition, a period of the horizontal synchronization clock signal is determined depending on the number of pixels to be scanned, and thus it is difficult to enable the period to be smaller than a specific period. Specifically, a frequency of the horizontal synchronization clock signal is, for example, about 30 kHz, and a period thereof in this case is about 33 µs. For this reason, in the control using the vertical synchronization clock signal and the horizontal synchronization clock signal, it is difficult to control the very short exposure time of µs unit with high accuracy. For example, if an exposure time of 1/16000 seconds (about 61 µs) is to be realized, when a period of a vertical synchronization clock signal which is generated in the allowable error range is used, there is concern that a variation in the period may be greater than the exposure time. In addition, even if a shutter is control in two clock cycles (66 µs) of the horizontal synchronization clock signal, an error with an exposure time to be realized becomes 10% or more. As described above, the period of the horizontal synchronization clock signal is unable to be shorter than a specific period, and thus it is difficult to improve accuracy.

The present technology has been made in light of these circumstances, and it is desirable to control an exposure time with high accuracy.

In light of the foregoing, according to a first embodiment of the present technology, there is provided a control circuit and a method thereof, the control circuit including a horizontal synchronization clock counting unit that counts the number of clock cycles of a horizontal synchronization clock signal for instructing a timing of starting scanning pixels in a horizontal direction of a pixel group arranged in a two-dimensional lattice shape, so as to be used as a horizontal synchronization clock count value, a high frequency clock counting unit that counts the number of clock cycles of a high frequency clock signal with a higher frequency than the horizontal synchronization clock signal, so as to be used as a high frequency clock count value, and a timing determination unit that determines timings of starting and ending exposure for the pixels on the basis of the horizontal synchronization clock count value and the high frequency clock count value. Thereby, it is possible to determine timings of starting and ending exposure on the basis of the horizontal synchronization clock count value and the high frequency clock count value.

Further, the high frequency clock counting unit may count the number of clock cycles of the high frequency clock signal by using the time at which the horizontal synchronization clock count value becomes a first start set value as a starting point. And the timing determination unit may include a start timing determination portion that sets the time at which the high frequency clock count value becomes a second start set value as the timing of starting exposure, and an end timing determination portion that determines the timing of ending exposure on the basis of the high frequency clock count value. Thereby, it is possible to set, as the timing of starting exposure, the time when the high frequency clock count value counted using the time at which the horizontal synchronization clock count value becomes the first start set value as a starting point becomes the second start set value.

Further, the high frequency clock counting unit may further count the number of clock cycles of the high frequency clock signal by using the time at which the horizontal synchronization clock count value becomes the first end set value as a starting point. And the end timing determination portion may set the time at which the high frequency clock count value becomes the second end set value as the timing of ending exposure. Thereby, it is possible to set, as the timing of ending exposure, the time when the high frequency clock count value counted using the time at which the horizontal synchronization clock count value becomes the first end set value as a starting point becomes the second end set value.

Further, the horizontal synchronization clock counting unit may set the horizontal synchronization clock count value to an initial value when the horizontal synchronization clock count value becomes the first end set value. Thereby, it is possible to set the horizontal synchronization clock count value to an initial value when the horizontal synchronization clock count value becomes the first end set value.

Further, the horizontal synchronization clock counting unit may set the horizontal synchronization clock count value to an initial value in synchronization with a vertical synchronization clock signal for instructing a timing of starting an operation of the pixel group. Thereby, it is possible to set the horizontal synchronization clock count value to an initial value in synchronization with the vertical synchronization clock signal.

Further, the control circuit may further include a multiplication circuit that multiplies a frequency of the horizontal synchronization clock signal so as to generate the high frequency clock signal. Thereby, it is possible to generate a signal obtained by multiplying the horizontal synchronization clock signal as the high frequency clock signal.

Further, according to a second embodiment of the present technology, there is provided an imaging device including a pixel group that is arranged in a two-dimensional lattice shape, a horizontal synchronization clock counting unit that counts the number of clock cycles of a horizontal synchronization clock signal for instructing a timing of starting scanning pixels in a horizontal direction of the pixel group, so as to be used as a horizontal synchronization clock count value, a high frequency clock counting unit that counts the number of clock cycles of a high frequency clock signal with a higher frequency than the horizontal synchronization clock signal, so as to be used as a high frequency clock count value, and a timing determination unit that determines timings of starting and ending exposure for the pixels on the basis of the horizontal synchronization clock count value and the high frequency clock count value. Thereby, it is possible to determine timings of starting and ending exposure on the basis of the horizontal synchronization clock count value and the high frequency clock count value.

According to the present technology, it is possible to achieve an excellent effect in which an exposure time during imaging can be controlled with high accuracy.

DETAILED DESCRIPTION OF THE EMBODIMENT(S)

Figure 1:
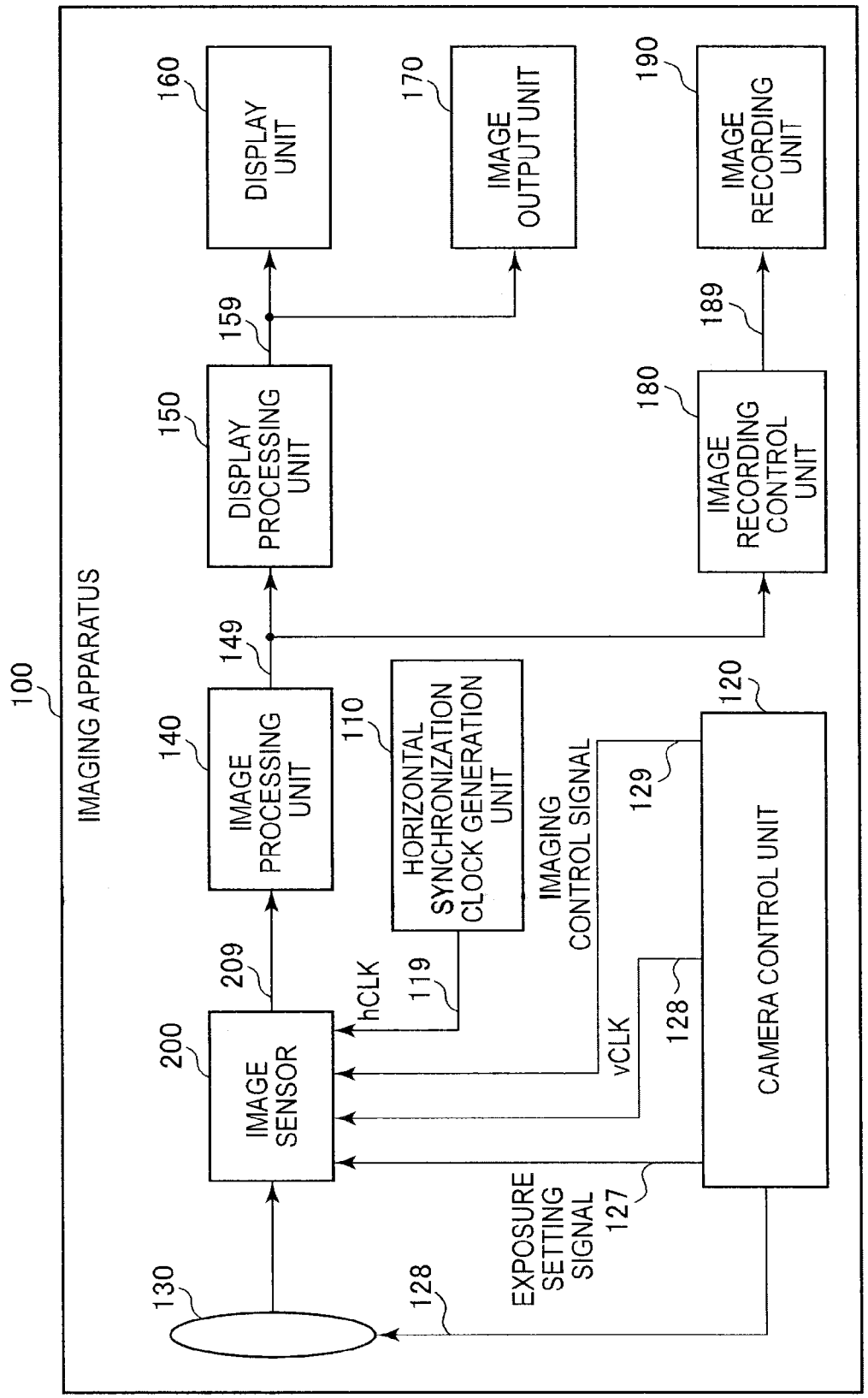
FIG. 1 is a block diagram illustrating a configuration example of an imaging apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described. The described will be made in the following order.

1. First Embodiment (an example of controlling an exposure time based on horizontal synchronization clock and high frequency clock count values)
2. Second Embodiment (an example of controlling an exposure time based on a horizontal synchronization clock count value which is reset when the horizontal synchronization clock count value is ms)

1. First Embodiment

Configuration Example of Imaging Apparatus

FIG. 1 is a block diagram illustrating a configuration example of an imaging apparatus 100 according to the first embodiment. The imaging apparatus 100 includes a horizontal synchronization clock generation unit 110, a camera control unit 120, an imaging lens 130, an imaging processing unit 140, a display processing unit 150, a display unit 160, an image output unit 170, an image recording control unit 180, an image recording unit 190, and an imaging device 200.

The horizontal synchronization clock generation unit 110 generates a horizontal synchronization clock signal hCLK by using an oscillation circuit or the like. The horizontal synchronization clock signal hCLK is a signal for instructing a timing of starting scanning pixels in the horizontal direction of a pixel group which is arranged in a two-dimensional lattice shape in the imaging device 200. The horizontal synchronization clock generation unit 110 supplies the generated horizontal synchronization clock signal hCLK to the imaging device 200 via a signal line 119.

The camera control unit 120 controls the overall imaging apparatus 100. The camera control unit 120 supplies a set exposure time which is an exposure time corresponding to a shutter speed set in advance before imaging, to the imaging device 200 via a signal line 127. A user can change the exposure time by operating a button or the like provided in the imaging apparatus 100.

In addition, the camera control unit 120 generates a vertical synchronization clock signal vCLK which is supplied to the imaging device 200 via a signal line 128. The vertical synchronization clock signal vCLK is a signal for instructing a timing of starting scanning the pixel group of the imaging device 200, and is generated, for example, by software. A period of the vertical synchronization clock signal vCLK is set according to the number of rows or columns which are scanned in a single image. For example, it is considered that m rows are scanned in a single image and k columns are scanned in each row. In this case, the horizontal synchronization clock signal hCLK with a period necessary to scan the k pixels is generated, and time necessary to scan the m rows by the horizontal synchronization clock signal hCLK is set as a period of the vertical synchronization clock signal vCLK. Here, m and k are integers of 2 or more.

In addition, the camera control unit 120 generates an imaging control signal for instructing imaging on the basis of an operation of the shutter button by the user or a timer value of a self-timer, and supplies the imaging color signal to the imaging device 200 via a signal line 129. The camera control unit 120 generates the imaging control signal which is set to a low level, for example, when imaging is performed, and is set to a high level when imaging is not performed. More specifically, for example, the camera control unit 120 generates the imaging control signal which is set to a low level when the shutter button is pressed, and is set to a high level when the shutter button is not pressed. Thereby, imaging is performed while the imaging control signal is set to a low level. In a case where a duration of the low level is longer than a capturing time of a single image, a plurality of images are continuously captured.

The imaging device 200 converts light which has passed through the imaging lens 130 into an electric signal with a level corresponding to the exposure time. The imaging device 200 includes the pixel group arranged in a two-dimensional lattice shape. When starting of imaging is instructed by the imaging control signal, the imaging device 200 performs exposure for the pixel group during the set exposure time. In addition, the imaging device 200 reads a pixel value corresponding to the exposure time from the pixel group according to the vertical synchronization clock signal and the horizontal synchronization clock signal, so as to be output to the image processing unit 140 via a signal line 209.

The imaging lens 130 is a lens for imaging, which is disposed such that light passing through the imaging lens 130 forms an image on the imaging device 200.

The image processing unit 140 performs image processes such as a demosaicing process or a white balance process on the image read from the imaging device 200. The image processing unit 140 outputs the image having undergone the image processes to the display processing unit 150 and the image recording control unit 180 via a signal line 149.

The display processing unit 150 performs display processes such as a gamma correction process, a color correction process or a contrast adjustment process on the image as necessary. The display processing unit 150 outputs the image having undergone the display processes to the display unit 160 and the image output unit 170 via a signal line 159.

The display unit 160 displays the image received from the display processing unit 150 thereon. The image output unit 170 outputs the image from the display processing unit 150 to outside of the imaging apparatus 100.

The image recording control unit 180 outputs the image received from the image processing unit 140 to the image recording unit 190 via a signal line 189, and records the image in the image recording unit 190. The image recording unit 190 records the image therein.

Configuration Example of Imaging Device

Figure 2:
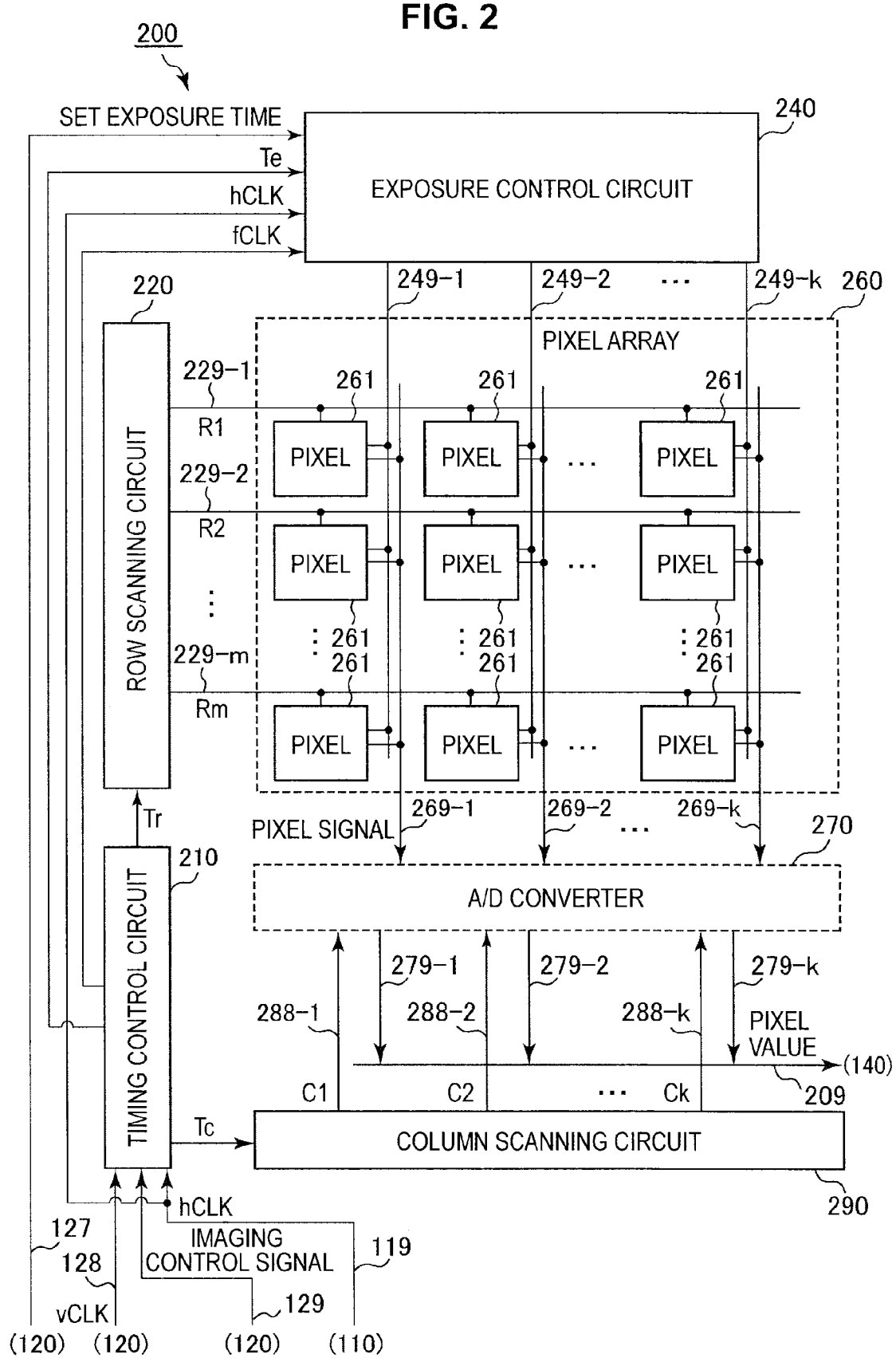
FIG. 2 is a block diagram illustrating a configuration example of an imaging device according to the first embodiment.

FIG. 2 is a block diagram illustrating a configuration example of the imaging device according to the first embodiment. The imaging device 200 includes a timing control circuit 210, a row scanning circuit 220, and an exposure control circuit 240. In addition, the imaging device 200 includes a pixel array 260, an Analog to Digital (A/D) converter 270, and a column scanning circuit 290.

The timing control circuit 210 controls a scanning timing and an exposure timing of each of the rows and columns. This timing control circuit 210 receives the horizontal synchronization clock signal hCLK from the horizontal synchronization clock generation unit 110, and receives the vertical synchronization clock signal vCLK and the imaging control signal from the camera control unit 120. The timing control circuit 210 generates an exposure timing signal Te and a row scanning timing signal Tr in synchronization with the vertical synchronization clock signal vCLK while imaging is instructed by the imaging control signal. Here, the exposure timing signal Te is a signal for instructing a timing of performing exposure, and the row scanning timing signal Tr is a signal for instructing a timing of starting scanning in the horizontal direction. An image which is exposed according to a certain exposure timing signal Te is read according to a row scanning timing signal Tr which is generated at the same time as generation of the next exposure timing signal Te. Therefore, in a clock cycle of the first vertical synchronization clock signal vCLK after starting of imaging is instructed, exposure of the first image is not completed, and an image which is a target read according to the row scanning timing signal Tr is not generated. For this reason, the timing control circuit 210 does not generate the row scanning timing signal Tr in the clock cycle of the first vertical synchronization clock signal vCLK.

The timing control circuit 210 supplies the generated exposure timing signal Te to the exposure control circuit 240. In addition, the timing control circuit 210 supplies the generated row scanning timing signal Tr to the row scanning circuit 220.

Further, the timing control circuit 210 generates a column scanning timing signal Tc in synchronization with the horizontal synchronization clock signal hCLK while the imaging is instructed by the imaging control signal. Here, the column scanning timing signal Tc is a signal for instructing a timing of starting scanning each pixel belonging to each column in the scanned row. The timing control circuit 210 supplies the generated column scanning timing signal Tc to the column scanning circuit 290.

In addition, the timing control circuit 210 generates a high frequency clock signal fCLK which is supplied to the exposure control circuit 240. Here, the high frequency clock signal fCLK is a clock signal of which a frequency is higher than that of the horizontal synchronization clock signal hCLK.

The row scanning circuit 220 scans each row according to the row scanning timing signal Tr. When the row scanning timing signal Tr is supplied, the row scanning circuit 220 generates a row scanning signal for scanning the row for each row, and sequentially outputs the row scanning signal to the respective rows via signal lines 229-1 to 229-m, thereby performing scanning. For example, these row scanning signals are set to a low level when the row is scanned, and are set to a high level when the row is not scanned.

When the exposure timing signal Te is supplied, the exposure control circuit 240 controls an exposure time on the basis of the horizontal synchronization clock signal hCLK, the high frequency clock signal fCLK, and the set exposure time. Details of a method of controlling the exposure time will be described later.

The pixel array 260 includes a plurality of pixels 261 arranged in a two-dimensional lattice shape. Each pixel outputs a pixel signal which is an electric signal with a potential corresponding to the exposure time, according to the row scanning signal. For example, when the row scanning signal in a low level is input, the pixel outputs the pixel signal to the A/D converter 270.

The A/D converter 270 receives the pixel signal from the pixel array 260, and converts the pixel signal from an analog signal into a digital signal. The A/D converter 270 uses, for example, an integral method of integrating a voltage of the pixel signal, measuring time until an integral value arrives at a predetermined reference voltage, and setting the integral value as a pixel value. In addition, the AID converter 270 holds the A/D-converted pixel value.

Further, a column scanning signal is input to the A/D converter 270 via signal lines 288-1 to 288-k. The column scanning signal is a signal for outputting a pixel value corresponding to the column to the A/D converter 270. For example, the column scanning signal is set to a low level when the pixel value is output, and is set to a high level when the pixel value is not output. The A/D converter 270 outputs the pixel value via a signal line 209 when the column scanning signal is in a low level.

The column scanning circuit 290 generates the column scanning signal according to the column scanning timing signal Tc, and reads and outputs a pixel value of each pixel in a row scanned by the row scanning circuit 220.

Configuration Example of Timing Control Circuit

Figure 3:
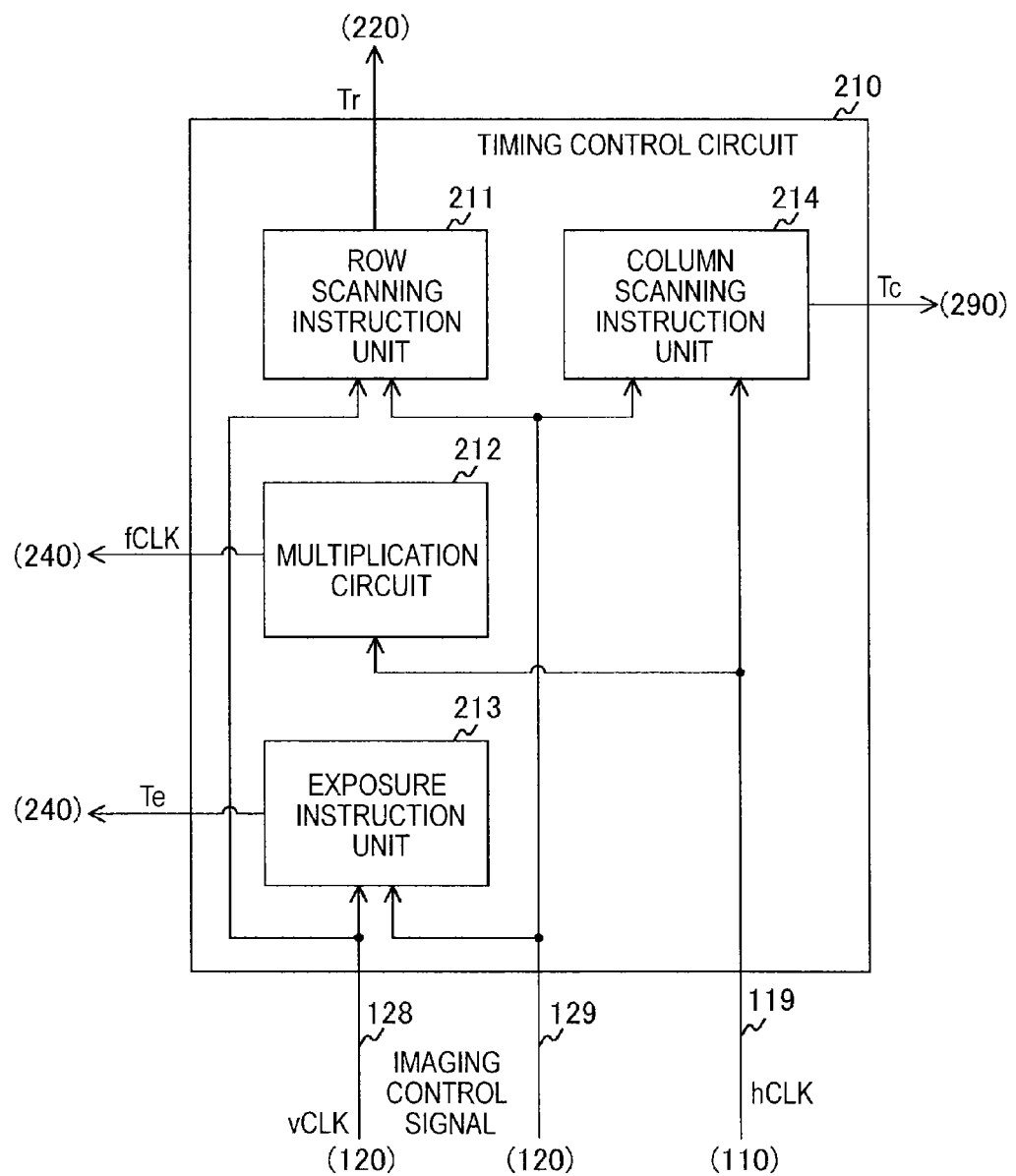
FIG. 3 is a block diagram illustrating a configuration example of a timing control circuit according to the first embodiment.

FIG. 3 is a block diagram illustrating a configuration example of the timing control circuit 210 according to the first embodiment. The timing control circuit 210 includes a row scanning instruction unit 211, a multiplication circuit 212, an exposure instruction unit 213, and a column scanning instruction unit 214.

The row scanning instruction unit 211 generates the row scanning timing signal Tr in synchronization with the vertical synchronization clock signal vCLK while imaging is instructed by the imaging control signal. The row scanning instruction unit 211 generates the row scanning timing signal Tr in synchronization with a falling edge of the vertical synchronization clock signal vCLK, for example, when the imaging control signal is in a low level. However, since exposure is not completed in a first falling edge of the vertical synchronization clock signal vCLK after the imaging control signal is turned to a low level, the row scanning instruction unit 211 does not generate the row scanning timing signal Tr. The row scanning instruction unit 211 supplies the generated row scanning timing signal Tr to the row scanning circuit 220.

The multiplication circuit 212 multiplies the horizontal synchronization clock signal hCLK by a predetermined multiplication number so as to generate the high frequency clock signal fCLK. The multiplication circuit 212 supplies the generated high frequency clock signal fCLK to the exposure control circuit 240.

In addition, the multiplication circuit 212 is provided outside the exposure control unit 240, but the multiplication circuit 212 may be provided inside the exposure control unit 240. Further, the multiplication circuit 212 may be provided outside the imaging device 200. Furthermore, the imaging apparatus 100 generates the high frequency clock signal fCLK through multiplication of the horizontal synchronization clock signal hCLK, but may generate the high frequency clock signal fCLK using an oscillation circuit or the like provided separately from the horizontal synchronization clock generation unit 110.

The exposure instruction unit 213 generates the exposure timing signal Te in synchronization with the vertical synchronization clock signal vCLK while imaging is instructed by the imaging control signal. The exposure instruction unit 213 generates the exposure timing signal Te in synchronization with a falling edge of the vertical synchronization clock signal vCLK, for example, when the imaging control signal is in a low level. The exposure instruction unit 213 supplies the generated exposure timing signal Te to the exposure control circuit 240.

The column scanning instruction unit 214 generates the row scanning timing signal Tr in synchronization with the horizontal synchronization clock signal hCLK while imaging is instructed by the imaging control signal. The column scanning instruction unit 214 generates the column scanning timing signal Tc in synchronization with a falling edge of the horizontal synchronization clock signal hCLK, for example, when the imaging control signal is in a low level. The column scanning instruction unit 214 supplies the generated column scanning timing signal Tc to the column scanning circuit 290.

Configuration Example of Exposure Control Circuit

Figure 4:
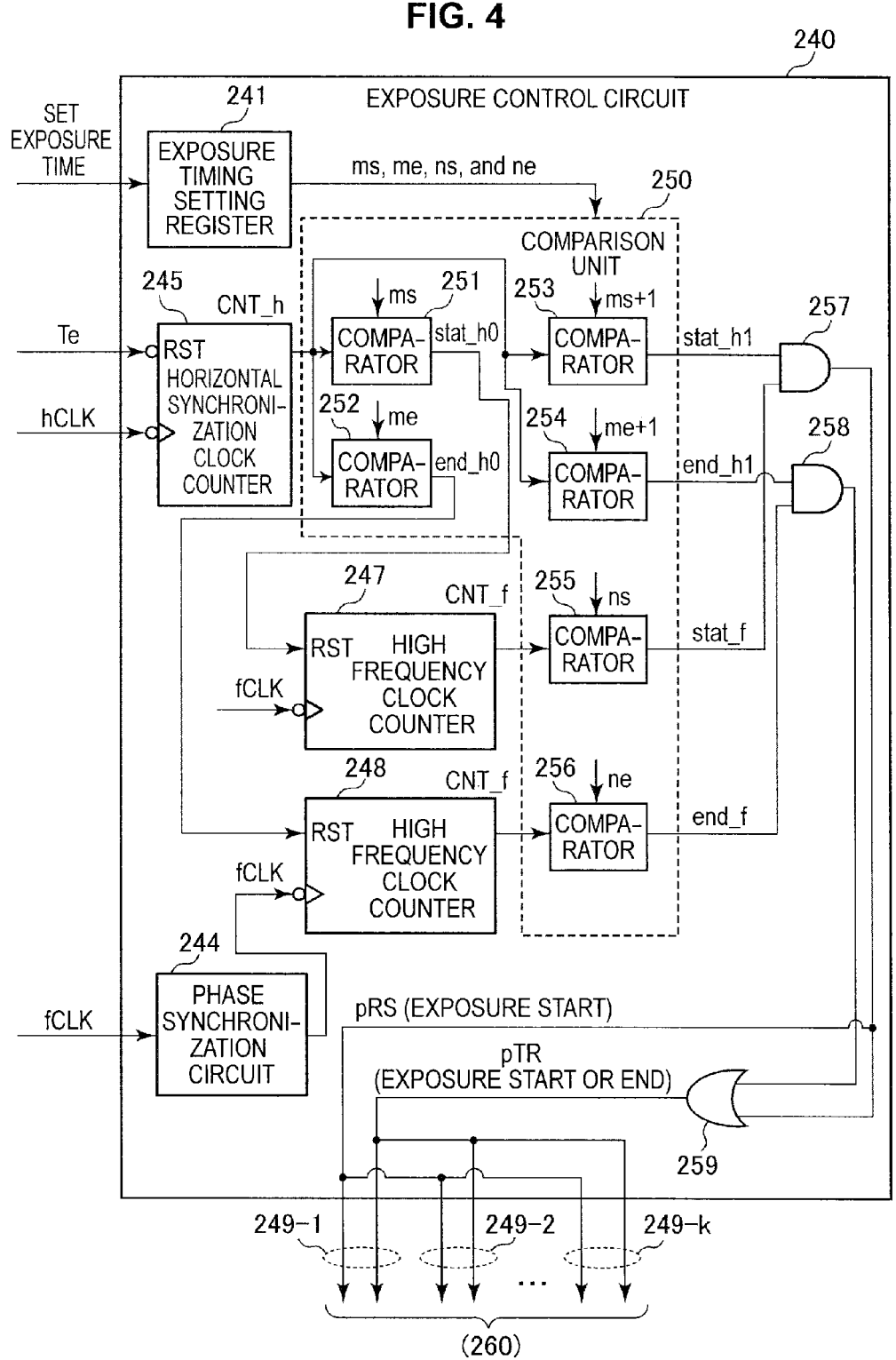
FIG. 4 is a block diagram illustrating a configuration example of an exposure control circuit according to the first embodiment.

FIG. 4 is a block diagram illustrating a configuration example of the exposure control circuit 240 according to the first embodiment. The exposure control circuit 240 includes a phase synchronization circuit 244, an exposure timing setting register 241, a horizontal synchronization clock counter 245, high frequency clock counters 247 and 248, and a comparison unit 250. In addition, the exposure control circuit 240 includes AND (logical product) gates 257 and 258, and an OR (logical sum) gate 259.

The exposure timing setting register 241 stores set values of timings of starting and ending exposure based on the set exposure time. The exposure timing setting register 241 stores, for example, start set values ms and ns and end set values me and ne.

The start set value ms is a set value of the number of clock cycles of the horizontal synchronization clock signal hCLK which is to be counted from a falling edge of the exposure timing signal Te to a time point of starting of exposure. The end set value me is a set value of the number of clock cycles of the horizontal synchronization clock signal hCLK which is to be counted from a falling edge of the exposure timing signal Te to a time point of ending of exposure.

The start set value ns is a set value of the number of clock cycles of the high frequency clock signal fCLK which is to be counted from the time when the number of clock cycles of the horizontal synchronization clock signal hCLK becomes ms to a time point of starting of exposure. The end set value ne is a set value of the number of clock cycles of the high frequency clock signal fCLK which is to be counted from the time when the number of clock cycles of the horizontal synchronization clock signal hCLK becomes me to a time point of ending of the exposure.

The phase synchronization circuit 244 generates a signal in a stable state, which is synchronized with a phase of the input high frequency clock signal fCLK. For example, the phase synchronization circuit 244 supplies the input high frequency clock signal fCLK to the high frequency clock counters 247 and 248 without dividing the input high frequency clock signal fCLK. In addition, in a case where the high frequency clock signal fCLK is in a sufficiently stable state, the phase synchronization circuit 244 may not be provided in the exposure control circuit 240. In this case, the high frequency clock signal fCLK from the timing control circuit 210 is directly input to the high frequency clock counters 247 and 248.

The horizontal synchronization clock counter 245 counts the number of clock cycles of the horizontal synchronization clock signal hCLK. For example, the horizontal synchronization clock counter 245 sets a count value when the exposure timing signal Te falls to an initial value (for example, "0"), and increases a count value in synchronization with a falling edge of the horizontal synchronization clock signal hCLK. Thereby, the number of clock cycles of the horizontal synchronization clock signal hCLK from a falling edge of the exposure timing signal Te is counted. The horizontal synchronization clock counter 245 supplies the count value to the comparison unit 250 as a horizontal synchronization clock count value CNT_h. In addition, the horizontal synchronization clock counter 245 is an example of the horizontal synchronization clock counting unit defined in the claims.

The comparison unit 250 includes comparators 251, 252, 252, 253, 254, 255 and 256. The comparator 251 compares the horizontal synchronization clock count value CNT_h with the start set value ms. For example, the comparator 251 supplies a comparison result, which is turned to a high level when compared values conform to each other and is turned to a low level when compared values do not conform, to the high frequency clock counter 247 as a comparison result stat_h0.

The comparator 252 compares the horizontal synchronization clock count value CNT_h with the end set value me. For example, the comparator 252 supplies a comparison result, which is turned to a high level when compared values conform to each other and is turned to a low level when compared values do not conform, to the high frequency clock counter 248 as a comparison result end_h0.

The high frequency clock counter 247 counts the number of clock cycles of the high frequency clock signal fCLK. For example, the high frequency clock counter 247 sets a count value when the comparison result stat_h0 is turned to a high level to an initial value (for example, "1"), and increases the count value in synchronization with a falling edge of the high frequency clock signal fCLK. Thereby, the number of clock cycles of the high frequency clock signal fCLK from the time when the number of clock cycles of the horizontal synchronization clock signal hCLK becomes ms is counted. The high frequency clock counter 247 supplies the count value to the comparator 255 as a high frequency clock count value CNT_f.

The high frequency clock counter 248 counts the number of clock cycles of the high frequency clock signal fCLK. The high frequency clock counter 248 has the same configuration as the high frequency clock counter 247 except for setting a count value to an initial value when the comparison result end_h0 is turned to a high level. The high frequency clock counter 248 supplies the count value to the comparator 256 as a high frequency clock count value CNT_f. In addition, the high frequency clock counters 247 and 248 are an example of the high frequency clock counting unit defined in the claims.

The comparator 253 compares the horizontal synchronization clock count value CNT_h with a value obtained by adding "1" to the start set value ms. The comparator 253 supplies a comparison result, which is turned to a high level when compared values conform to each other and is turned to a low level when compared values do not conform, to the AND gate 257 as a comparison result stat_h1. In addition, an adder which adds "1" to the start set value ms is not shown in FIG. 4.

The comparator 254 compares the horizontal synchronization clock count value CNT_h with a value obtained by adding "1" to the end set value me. For example, the comparator 254 supplies a comparison result, which is turned to a high level when compared values conform to each other and is turned to a low level when compared values do not conform, to the AND gate 258 as a comparison result end_h1. In addition, an adder which adds "1" to the end set value me is not shown in FIG. 4.

The comparator 255 compares the high frequency clock count value CNT_f from the high frequency clock counter 247 with the start set value ns. For example, the comparator 255 supplies a comparison result, which is turned to a high level when compared values conform to each other and is turned to a low level when compared values do not conform, to the AND gate 257 as a comparison result stat_f The comparator 256 compares the high frequency clock count value CNT_f from the high frequency clock counter 248 with the end set value ne. For example, the comparator 256 supplies a comparison result, which is turned to a high level when compared values conform to each other and is turned to a low level when compared values do not conform, to the AND gate 257 as a comparison result end_f.

The AND gates 257 and 258 output a logical product of input signals. The AND gate 257 generates a logical product of the comparison result stat_h1 and the comparison result stat_f. The AND gate 257 outputs the generated logical product to all the pixels of the pixel array 260 as a reset signal pRS, and also outputs the generated logical product to the OR gate 259. The reset signal pRS is a signal for setting an amount of charge accumulated in the pixels to an initial value.

The AND gate 258 generates a logical product of the comparison result End_h1 and the comparison result end_f so as to be output to the OR gate 259. In addition, the comparison unit 250, the AND gate 257, and the AND gate 258 are an example of the exposure timing determination unit defined in the claims.

The OR gate 259 outputs a logical sum of input signals. The OR gate 259 generates a logical sum of the signals from the AND gates 257 and 258 and outputs the logical sum to all the pixels of the pixel array 260 as a transmission signal pTR. The transmission signal pTR is a signal for accumulating photoelectric-converted charge in the pixels.

With the configuration exemplified in FIG. 4, when the horizontal synchronization clock count value CNT_f becomes ms, the high frequency clock counter 247 starts counting the high frequency clock count value CNT_f. In addition, when a count value of the high frequency clock count value CNT_f becomes ns, an output of the AND gate 257 is turned to a high level. Thereby, the reset signal pRS and the transmission signal pTR of a high level are output to all the pixels, an amount of charge accumulated in the pixels is set to an initial value, and thus exposure starts. In other words, an exposure start timing is determined by the AND gate 257, and an electronic shutter is turned to an open state.

In addition, when the horizontal synchronization clock count value CNT_h becomes me, the high frequency clock counter 248 starts counting the high frequency clock count value CNT_f. In addition, when a count value of the high frequency clock count value CNT_f becomes ne, an output of the AND gate 258 is turned to a high level. Thereby, the transmission signal pTR of a high level is output to all the pixels, an amount of charge corresponding to the exposure time is accumulated, and thus exposure ends. In other words, an exposure end timing is determined by the AND gate 258 and an electronic shutter is turned to a closed state.

In addition, each of the horizontal synchronization clock counter 245 and the high frequency clock counters 247 and 248 may be a down-counter not an up-counter. Further, the exposure control circuit 240 controls an exposure time through opening and closing of the electronic shutter, but the exposure time may be controlled through opening and closing of a mechanical shutter. In this case, the exposure control circuit 240 is not provided with the OR gate 259, and outputs an output of the AND gate 257 as a signal for instructing opening of the mechanical shutter. In addition, the exposure control circuit 240 outputs an output of the AND gate 258 as a signal for instructing closing of the mechanical shutter.

Configuration Example of Pixel

Figure 5:
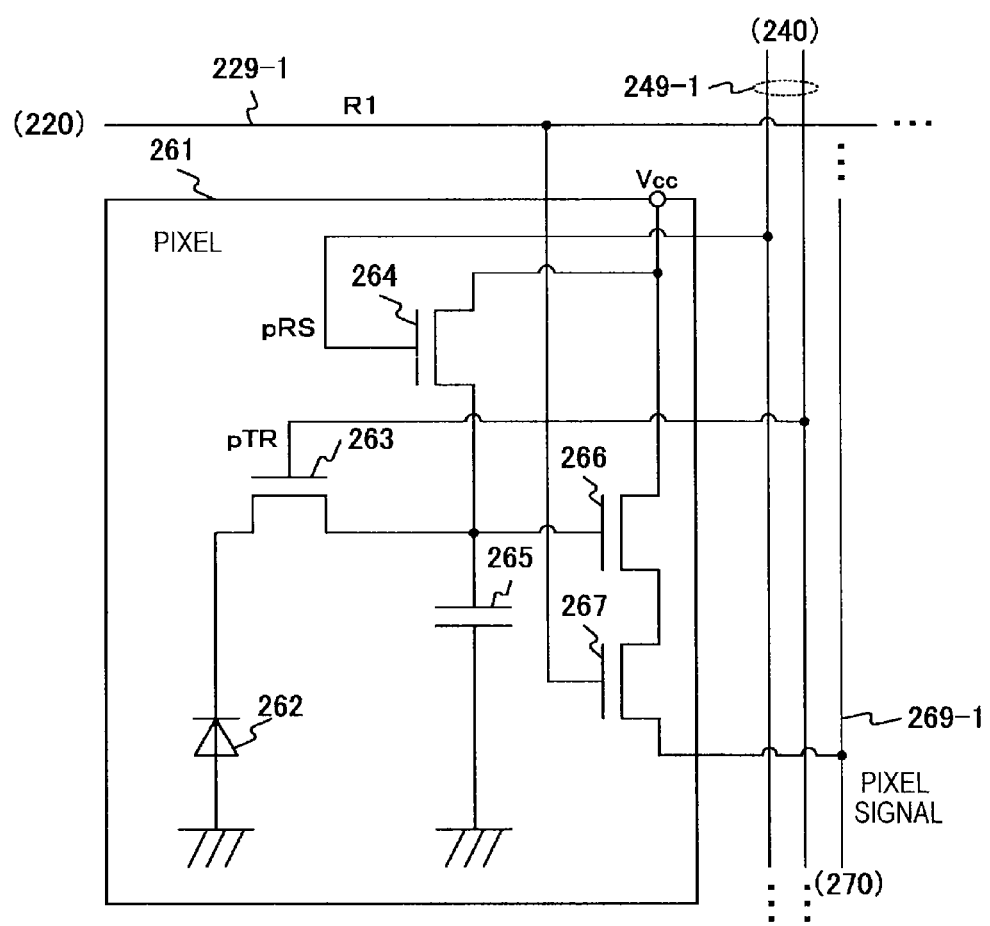
FIG. 5 is a diagram illustrating an example of an equivalent circuit of a pixel according to the first embodiment.

FIG. 5 is a diagram illustrating an example of an equivalent circuit of the pixel 261 according to the first embodiment. The pixel 261 includes a photodiode 262, a transfer transistor 263, a reset transistor 264, a floating diffusion layer 265, an amplification transistor 266, and a selection transistor 267.

The photodiode 262 converts received light into charge. The transfer transistor 263 is an element for transmitting the charge converted by the photodiode 262 to the floating diffusion layer 265 according to the transmission signal pTR. An input terminal of the transfer transistor 263 is connected to an output terminal of the photodiode 262, and an output terminal thereof is connected to the floating diffusion layer 265. In addition, a gate terminal of the transfer transistor 263 is connected to a signal line corresponding to the column among the signal lines 249-1 to 249-$k$. For example, if the pixel 261 is located in a c-th (where c is an integer of 1 to k) column, the gate terminal of the transfer transistor 263 is connected to the signal line 249-$c$. The transfer transistor 263 is turned on when a transmission signal in a high level is input, and the charge converted by the photodiode 262 is transmitted to the floating diffusion layer 265 when the transfer transistor 263 is turned on.

The reset transistor 264 is an element for setting a potential of the floating diffusion layer 265 to an initial potential according to the reset signal pRS. An input terminal of the reset transistor 264 is connected to a power supply terminal to which a power supply voltage Vcc is applied, and an output terminal thereof is connected to the floating diffusion layer 265. In addition, the reset signal pRS is input to the gate terminal of the reset transistor 264. When the reset signal pRS of a high level is input, the reset transistor 264 is turned on. As a result, the charge accumulated in the floating diffusion layer 265 is emitted, and thus a potential of the floating diffusion layer 265 becomes an initial potential.

The floating diffusion layer 265 accumulates charge transmitted by the transfer transistor 263. One end of the floating diffusion layer 265 is connected to the ground terminal, and the other end thereof is connected to the output terminal of the transfer transistor 263, the output terminal of the reset transistor 264, and the gate terminal of the amplification transistor 266. Thereby, a potential corresponding to an amount of the charge accumulated in the floating diffusion layer 265 is applied to the gate terminal of the amplification transistor 266.

The amplification transistor 266 amplifies the applied potential. The input terminal of the amplification transistor 266 is connected to the power supply terminal, the output terminal thereof is connected to the input terminal of the selection transistor 267, and the gate terminal thereof is connected to the floating diffusion layer 265. The amplification transistor 266 amplifies a potential of the floating diffusion layer 265 with a predetermined gain ratio so as to be output to the selection transistor 267.

The selection transistor 267 outputs an electric signal of the potential amplified by the amplification transistor 266 according to the row scanning signal. The input terminal of the selection transistor 267 is connected to the output terminal of the amplification transistor 266, and the output terminal thereof is connected to a signal line corresponding to the column among the signal lines 249-1 to 249-$k$. For example, if the pixel 261 is located in a c-th (where c is an integer of 1 to k) column, the output terminal of the selection transistor 267 is connected to the signal line 249-$c$. In addition, the gate terminal of the selection transistor 267 is connected to a signal line corresponding to the row among the signal lines 229-1 to 229-$m$. For example, if the pixel 261 is located in an r-th (where r is an integer of 1 to m) row, the gate terminal of the selection transistor 267 is connected to the signal line 229-$r$. When the row scanning signal of a high level is input, the selection transistor 267 is turned on. As a result, an electric signal with a potential corresponding to a light amount is output from the pixel 261 to the A/D converter 270.

With the configuration exemplified in FIG. 5, when both the reset signal pRS and the transmission signal pTR are turned to a high level, the charge accumulated in the photodiode 262 is transmitted to the floating diffusion layer 265, and a potential of the floating diffusion layer 265 becomes an initial potential. At this time, the exposure starts. In addition, when only the transmission signal pTR is turned to a high level after both the reset signal pRS and the transmission signal pTR are turned to a low level for a predetermined time, charge accumulated for the time is transmitted to the floating diffusion layer 265. At this time, the exposure ends.

Operation Example of Imaging Device

Figure 6:
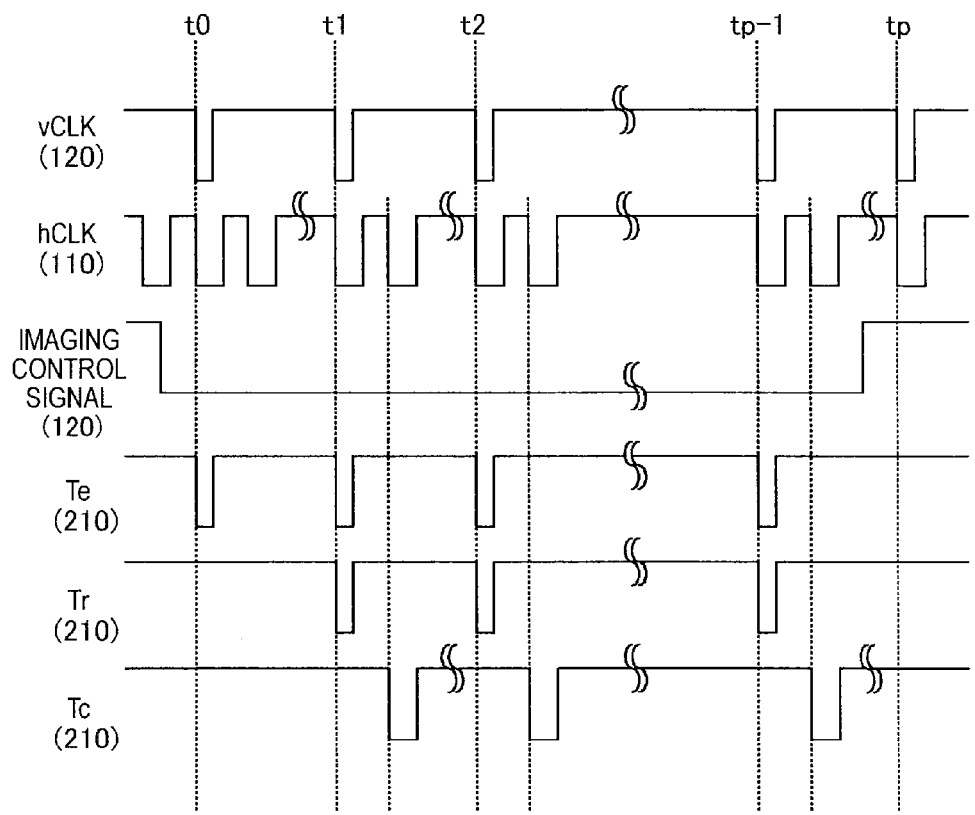
FIG. 6 is a timing chart illustrating an example of an operation of the imaging device according to the first embodiment.

FIG. 6 is a timing chart illustrating an example of an operation of the imaging device 200 according to the first embodiment. When the imaging control signal is in a low level, the timing control circuit 210 generates the exposure timing signal Te in synchronization with the vertical synchronization clock signal vCLK. In addition, when the imaging control signal is in a low level and exposure of at least one image ends, the timing control circuit 210 generates the row scanning timing signal Tr in synchronization with the vertical synchronization clock signal vCLK. For example, when the first exposure timing signal Te is generated at the time point t0, the first row scanning timing signal Tr is generated at the time point t1 when the next exposure timing signal Te is generated. Thereafter, as long as the imaging control signal is in a low level, the timing control circuit 210 generates the exposure timing signal Te and the row scanning timing signal Tr in synchronization with the vertical synchronization clock signal vCLK. In addition, after the row scanning timing signal Tr is generated, the timing control circuit 210 generates the column scanning timing signal Tc in synchronization with the horizontal synchronization clock signal hCLK.

Figure 7:
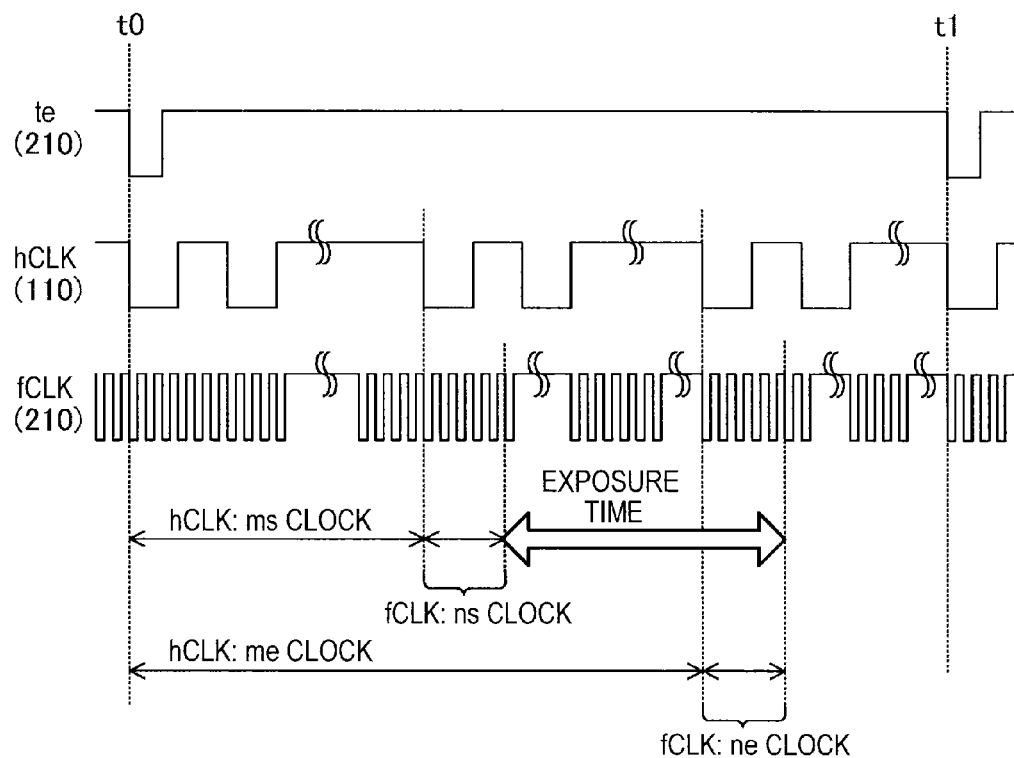
FIG. 7 is a timing chart illustrating an example of exposure control performed by the imaging device according to the first embodiment.

FIG. 7 is a timing chart illustrating an example of exposure control performed by the imaging device 200 according to the first embodiment. The imaging device 200 starts counting the number of clock cycles of the horizontal synchronization clock signal hCLK in synchronization with the exposure timing signal Te. The imaging device 200 starts counting the number of clock cycles of the high frequency clock signal fCLK from the time when the number of clock cycles becomes the start set value ms. When the number of clock cycles becomes the start set value ns, the imaging device 200 starts the exposure.

Next, the imaging device 200 starts counting the number of clock cycles of the high frequency clock signal fCLK from the time at which the number of clock cycles of the horizontal synchronization clock signal hCLK becomes the end set value me. In addition, when the number of clock cycles of the high frequency clock signal fCLK becomes the end set value ne, the imaging device 200 ends the exposure. As above, the imaging device 200 controls the exposure start and end timings in units of periods of the high frequency clock signal. For example, if a frequency of the high frequency clock signal fCLK is set to 10 MHz, a period thereof is 100 nanoseconds (ns). Therefore, the imaging device 200 can control the very short exposure time of the μs unit such as 1/16000 seconds (about 61 μs) with high accuracy.

Figure 8:
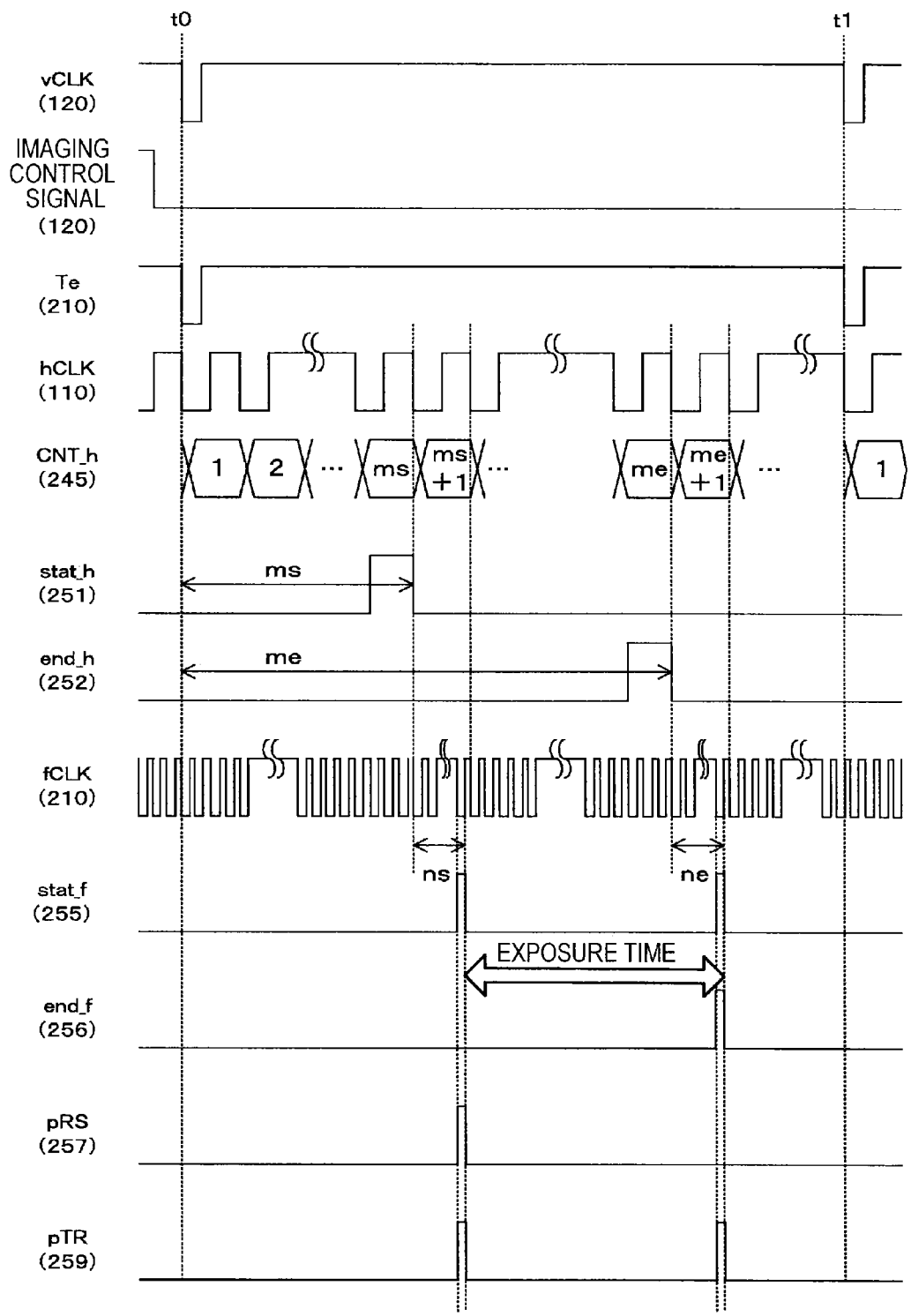
FIG. 8 is a timing chart illustrating details of the exposure control performed by the imaging device according to the first embodiment.

FIG. 8 is a timing chart illustrating details of the exposure control performed by the imaging device 200 according to the first embodiment. The timing control circuit 210 generates the exposure timing signal Te of a low level in synchronization with the vertical synchronization clock signal vCLK while the camera control unit 120 sets the imaging control signal to a low level.

The horizontal synchronization clock counter 245 sets the horizontal synchronization clock count value CNT_h to an initial value "1" when the exposure timing signal Te is in a low level. In addition, the horizontal synchronization clock counter 245 increases a count value thereof in synchronization with a falling edge of the horizontal synchronization clock signal hCLK when the exposure timing signal Te is in a low level.

When the horizontal synchronization clock count value CNT_h becomes the start set value ms, the comparator 251 outputs the comparison result stat_h0 of a high level. In addition, when the high frequency clock count value CNT_f counted from this point becomes the start set value ns, the comparator 255 outputs the comparison result stat_f of a high level. The reset signal pRS and the transmission signal pTR are turned to a high level by the comparison result stat_f, and the exposure starts.

In addition, when the horizontal synchronization clock count value CNT_h becomes the end set value me, the comparator 252 outputs the comparison result end_h0 of a high level. In addition, when the high frequency clock count value CNT_f counted from this point becomes the end set value ne, the comparator 256 outputs the comparison result end_f a high level. The transmission signal pTR is turned to a high level by the comparison result end_f and the exposure ends.

Figure 9:
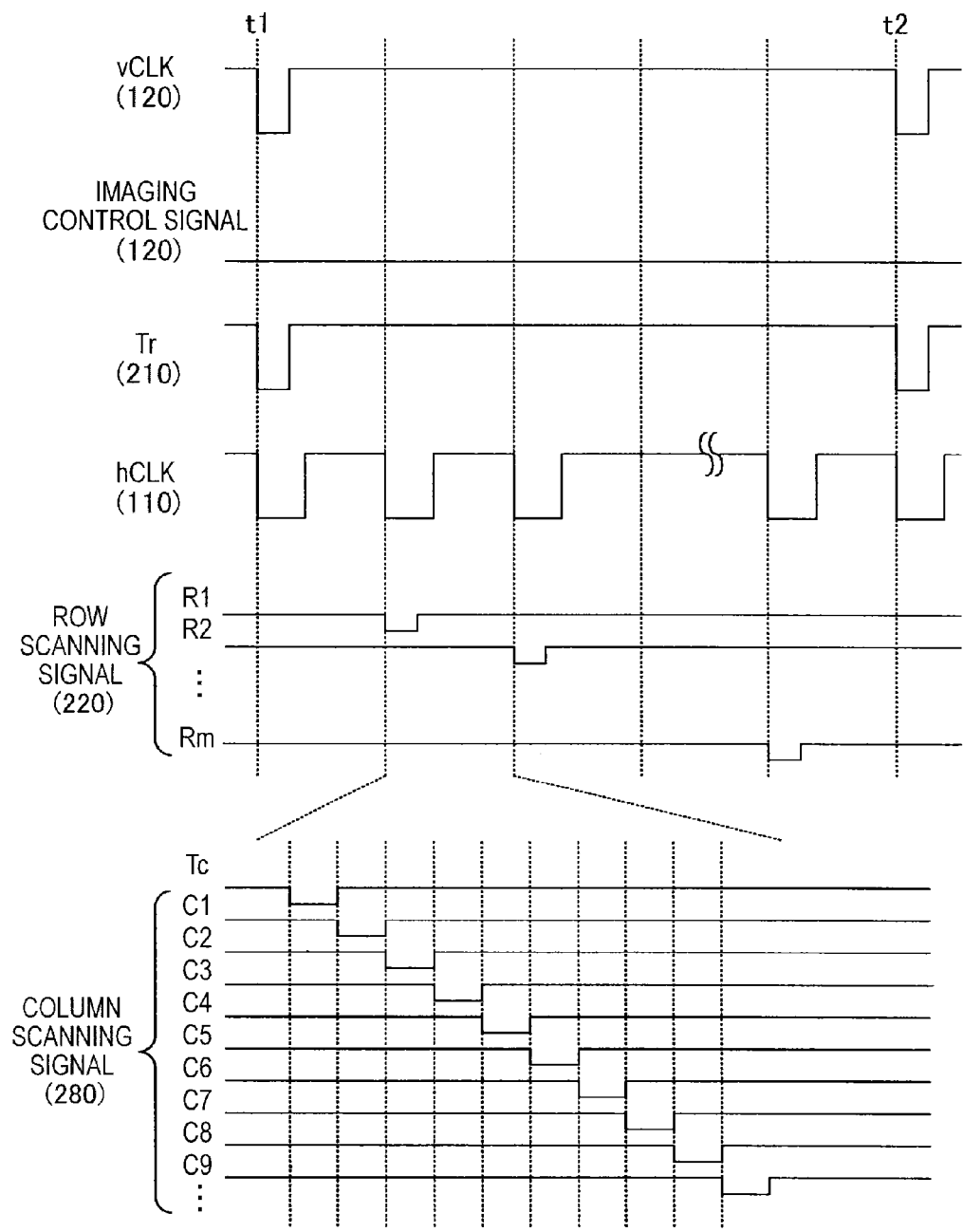
FIG. 9 is a timing chart illustrating an example of an operation when the imaging device according to the first embodiment performs scanning.

FIG. 9 is a timing chart illustrating an example of an operation when the imaging device 200 according to the first embodiment performs scanning. When the imaging control signal is turned to a low level, and exposure of at least one image ends, the timing control circuit 210 generates the row scanning timing signal Tr of a low level in synchronization with the vertical synchronization clock signal vCLK. When the row scanning timing signal Tr is generated, the row scanning circuit 220 sequentially outputs the row scanning signal to the respective rows in synchronization with the horizontal synchronization clock signal hCLK.

In addition, the timing control circuit 210 generates the column scanning timing signal Tc of a low level in synchronization with the horizontal synchronization clock signal hCLK. When the column scanning timing signal Tc is generated, the column scanning circuit 290 generates the column scanning signal which is sequentially output to the respective pixels in the scanned row. In addition, in FIG. 9, the exposure control operation by the imaging device 200 is not shown.

Figure 10:
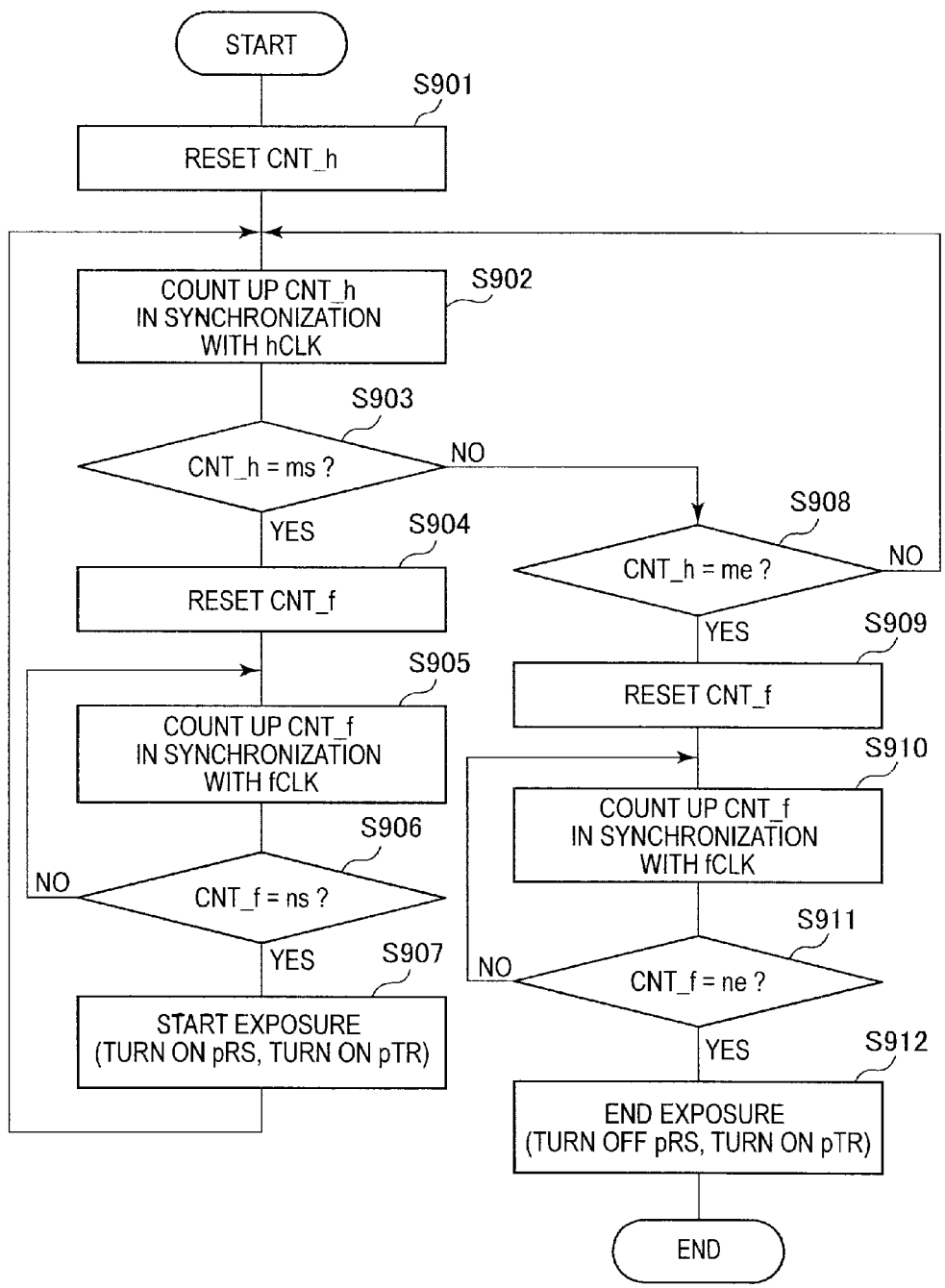
FIG. 10 is a flowchart illustrating an example of an operation of an exposure control circuit according to the first embodiment.

FIG. 10 is a flowchart illustrating an example of an operation of the exposure control circuit 240 according to the first embodiment. This operation starts when the exposure timing signal Te of a low level is generated.

The exposure control circuit 240 resets the horizontal synchronization clock count value CNT_h to an initial value (for example, "1") (step S901). The exposure control circuit 240 increases the horizontal synchronization clock count value CNT_h in synchronization with the horizontal synchronization clock signal hCLK (step S902).

The exposure control circuit 240 determines whether or not the high frequency clock count value CNT_h is the start set value ms (step S903). If the horizontal synchronization clock count value CNT_h is the start set value ms (step S903: Yes), the exposure control circuit 240 resets the high frequency clock count value CNT_f to an initial value (for example, "1") (step S904). In addition, the exposure control circuit 240 increases the high frequency clock count value CNT_f in synchronization with the high frequency clock signal fCLK (step S905).

The exposure control circuit 240 determines whether or not the high frequency clock count value CNT_f is the start set value ns (step S906). If it is determined that the high frequency clock count value CNT_f is not the start set value ns (step S906: No), the exposure control circuit 240 returns to step S905. On the other hand, if it is determined that the high frequency clock count value CNT_f is the start set value ns (step S906: Yes), the exposure control circuit 240 turns on the reset signal pRS and the transmission signal pTR so as to start the exposure for the pixels.

When the high frequency clock count value CNT_f becomes ns+1, the exposure control circuit 240 turns off the reset signal pRS and the transmission signal pTR (step S907). After step S907, the exposure control circuit 240 returns to step S902.

If the horizontal synchronization clock count value CNT_h is not the start set value ms (step S903: No), the exposure control circuit 240 determines whether or not the horizontal synchronization clock count value CNT_h is the end set value me (step S908). If the horizontal synchronization clock count value CNT_h is not the end set value me (step S908: No), the exposure control circuit 240 returns to step S902. On the other hand, if the horizontal synchronization clock count value CNT_h is the end set value me (step S908: Yes), the exposure control circuit 240 resets the high frequency clock count value CNT_j to an initial value (for example, "1") (step S909). The exposure control circuit 240 then increases the high frequency clock count value CNT_f in synchronization with the high frequency clock signal fCLK (step S910).

The exposure control circuit 240 determines whether or not the high frequency clock count value CNT_f is the end set value ne (step S911). If the high frequency clock count value CNT_f is not the end set value ne (step S911: No), the exposure control circuit 240 returns to step S910. On the other hand, if the high frequency clock count value CNT_f is the end set value ne (step S911: Yes), the exposure control circuit 240 remains the reset signal pRS to be turned off, and turns on the transmission signal pTR, so as to start the exposure for the pixels. When the high frequency clock count value CNT_f becomes ne+1, the exposure control circuit 240 turns off the reset signal pRS and the transmission signal pTR (step S912). After step S912, the exposure control circuit 240 ends the exposure control for a single image.

As above, according to the first embodiment of the present technology, the imaging device 200 can determine exposure start and end timings on the basis of count values of the horizontal synchronization clock signal hCLK and the high frequency clock signal fCLK. A frequency of the high frequency clock signal fCLK is higher than that of the horizontal synchronization clock signal hCLK, and thus the imaging device 200 can control an exposure time with higher accuracy than in a case of performing control in units of periods of the vertical synchronization clock signal vCLK or the horizontal synchronization clock signal hCLK.

Modified Example

Figure 11:
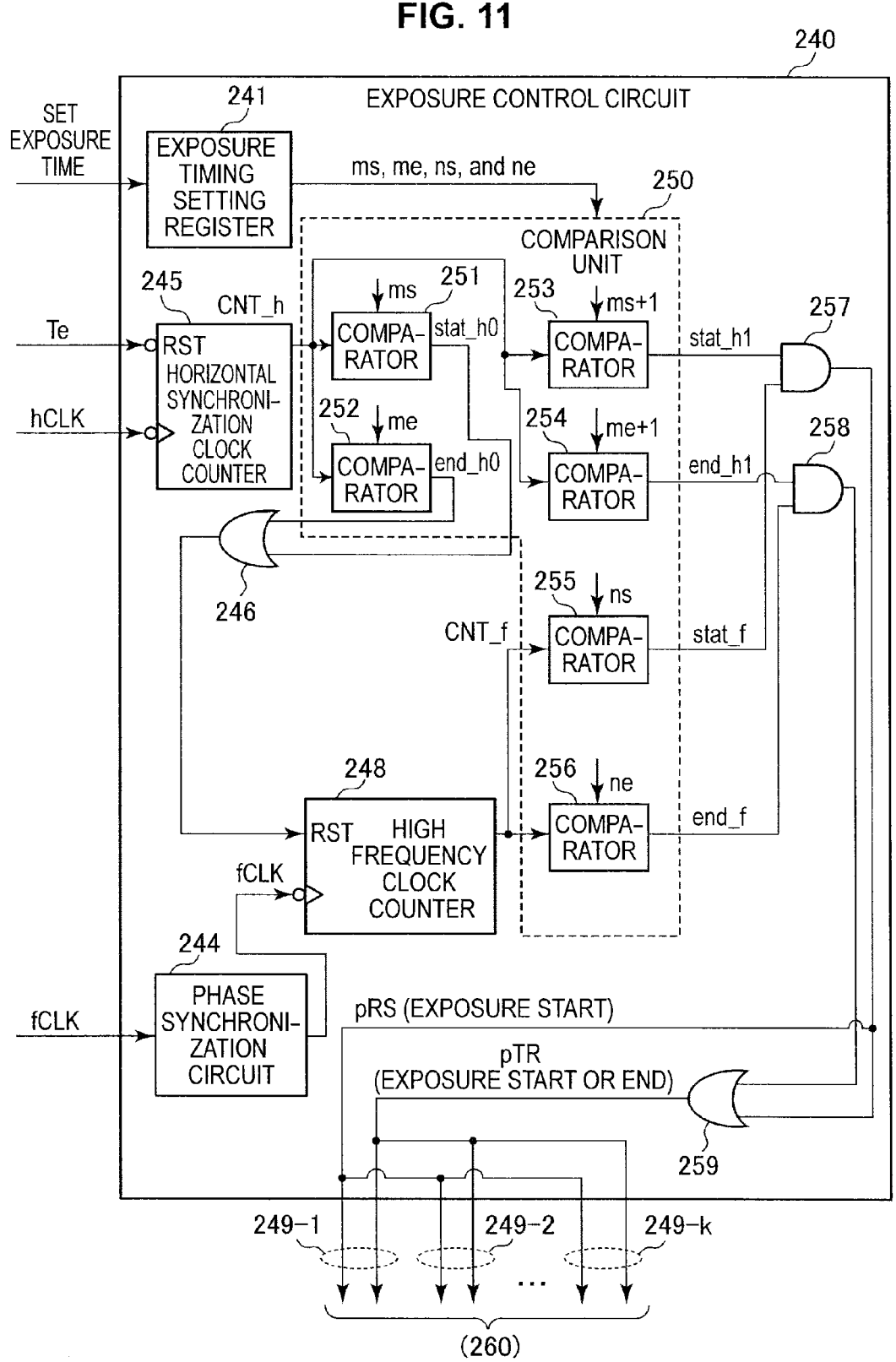
FIG. 11 is a block diagram illustrating a configuration example of an exposure control circuit according to a modified example of the first embodiment.

FIG. 11 is a block diagram illustrating a configuration example of the exposure control circuit 240 according to a modified example of the first embodiment. The exposure control circuit 240 according to the modified example is different from that according to the first embodiment in that the number of high frequency clock counters is reduced. Specifically, the exposure control circuit 240 according to the modified example does not include the high frequency clock counter 247 and further includes an OR gate 246.

The OR gate 246 generates a logical sum of the comparison results stat_h0 and end_h0. The OR gate 246 supplies the logical sum to the high frequency clock counter 248. The high frequency clock counter 248 sets the high frequency clock count value CNT_f to an initial value when the logical sum of the OR gate 246 is turned to a high level. The high frequency clock counter 248 supplies the high frequency clock count value CNT _f to the comparators 255 and 256. With this configuration, only a single high frequency clock counter is used.

2. Second Embodiment

Configuration Example of Exposure Control Circuit

Figure 12:
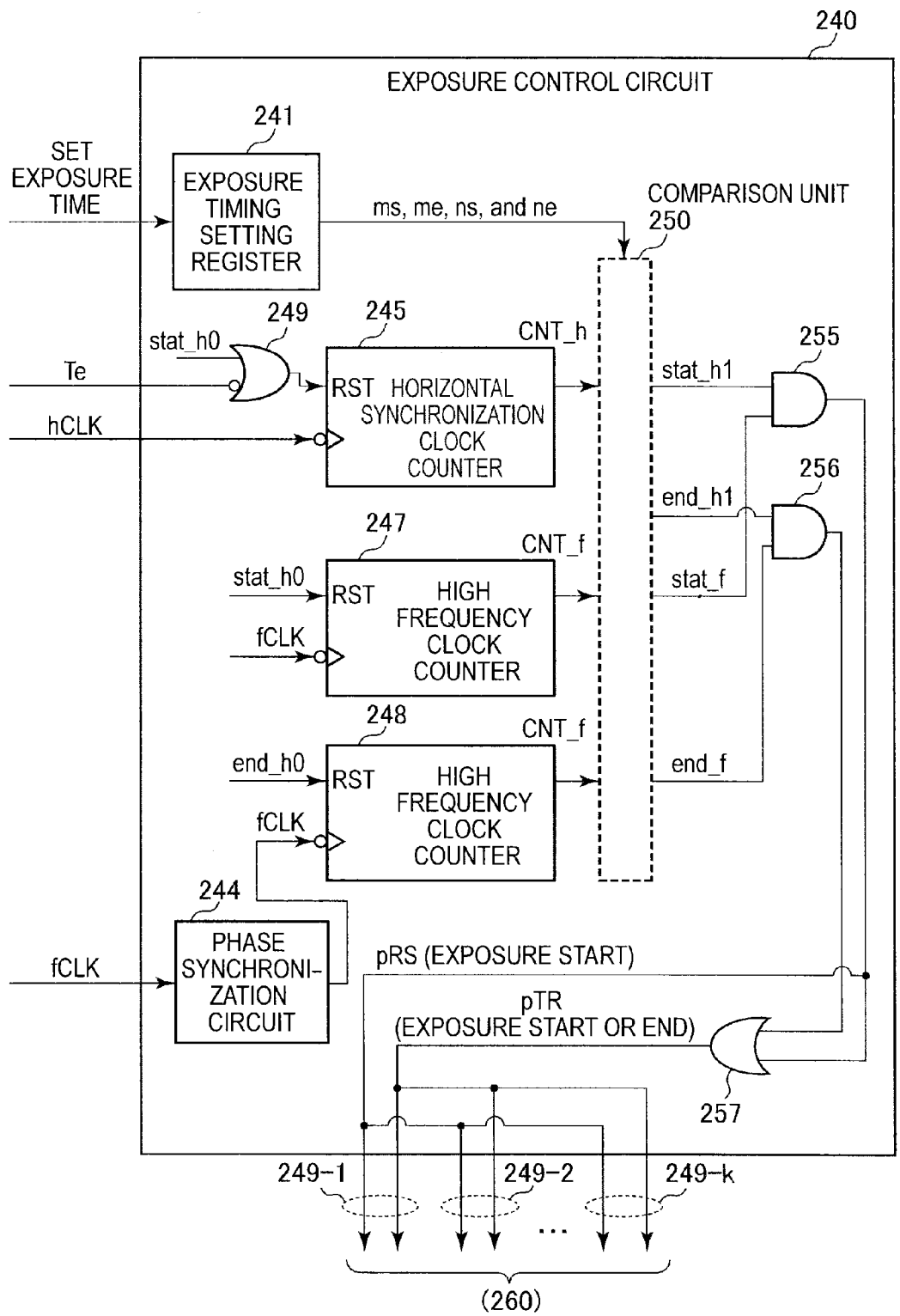
FIG. 12 is a block diagram illustrating a configuration example of an exposure control circuit according to a second embodiment.

FIG. 12 is a block diagram illustrating a configuration example of the exposure control circuit 240 according to the second embodiment. The exposure control circuit 240 according to the first embodiment starts counting the high frequency clock count value CNT_f when ms clock cycles have elapsed from a falling edge of the exposure timing signal Te. However, the exposure control circuit 240 may start counting the high frequency clock count value CNT_f when (ms+me) clock cycles have elapsed from a falling edge of the exposure timing signal Te. The exposure control circuit 240 according to the second embodiment start counting the high frequency clock count value CNT_f when (ms+me) clock cycles have elapsed, which is different from the first embodiment.

Specifically, the exposure control circuit 240 according to the second embodiment further includes a logic gate 249, which is different from the first embodiment.

The logic gate 249 generates a logical sum of a signal obtained by inverting the exposure timing signal Te and the comparison result stat_h0, so as to be output to the horizontal synchronization clock counter 245. The horizontal synchronization clock counter 245 sets the horizontal synchronization clock count value CNT_h to an initial value when the output signal from the logic gate 249 is turned to a high level. Thereby, when the exposure timing signal Te is turned to a low level or the horizontal synchronization clock count value CNT_h becomes ms, the horizontal synchronization clock count value CNT_h is reset. Therefore, counting of the high frequency clock count value CNT_f is started when the (ms+me) clock cycles have elapsed from a falling edge of the exposure timing signal Te.

Figure 13:
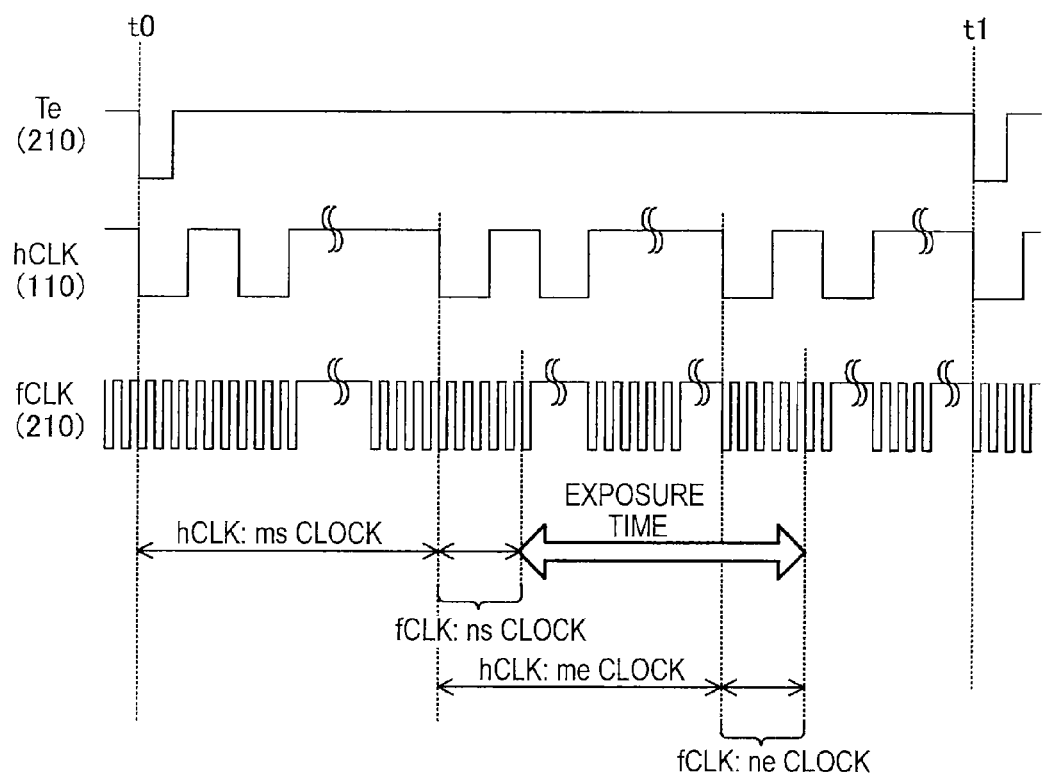
FIG. 13 is a timing chart illustrating an example of exposure control performed by an imaging device according to the second embodiment.

FIG. 13 is a timing chart illustrating an example of exposure control performed by the imaging device 200 according to the second embodiment. The imaging device 200 starts counting the number of clock cycles of the horizontal synchronization clock signal hCLK in synchronization with the exposure timing signal Te. When the number of clock cycles becomes ms, the imaging device 200 resets the horizontal synchronization clock count value CNT_h and starts counting the number of clock cycles of the high frequency clock signal fCLK. When the number of clock cycles of the high frequency clock signal fCLK becomes ns, the imaging device 200 starts the exposure.

Next, the imaging device 200 starts counting the number of clock cycles of the high frequency clock signal fCLK from the time at which the number of clock cycles of the horizontal synchronization clock signal hCLK becomes me. When the number of clock cycles of the high frequency clock signal fCLK becomes ne, the imaging device 200 ends the exposure.

As described above, according to the second embodiment of the present technology, the imaging device 200 can reset the horizontal synchronization clock count value CNT_h when the horizontal synchronization clock count value CNT_h becomes ms. Thereby, the imaging device 200 can start counting the number of clock cycles of the high frequency clock signal fCLK when (ms+me) clock cycles have elapsed from the generation of the exposure timing signal Te.

In addition, the above-described embodiments show an example for carrying out the present technology, and the matters in the embodiments and the matters specifying the invention in the claims respectively have correspondence relationships. Similarly, the matters specifying the invention in the claims respectively have correspondence relationships with the matters which are given the same name in the embodiments of the present technology. However, the present technology is not limited to the above-described embodiments, and may be carried out by variously modifying the embodiments within the scope without departing from the spirit thereof.

Additionally, the present technology may also be configured as below.

(1) A control circuit including:

a horizontal synchronization clock counting unit that counts the number of clock cycles of a horizontal synchronization clock signal for instructing a timing of starting scanning pixels in a horizontal direction of a pixel group arranged in a two-dimensional lattice shape, so as to be used as a horizontal synchronization clock count value;

a high frequency clock counting unit that counts the number of clock cycles of a high frequency clock signal with a higher frequency than the horizontal synchronization clock signal, so as to be used as a high frequency clock count value; and a timing determination unit that determines timings of starting and ending exposure for the pixels on the basis of the horizontal synchronization clock count value and the high frequency clock count value.

(2) The control circuit according to (1), wherein the high frequency clock counting unit counts the number of clock cycles of the high frequency clock signal by using the time at which the horizontal synchronization clock count value becomes a first start set value as a starting point, and wherein the timing determination unit includes a start timing determination portion that sets the time at which the high frequency clock count value becomes a second start set value as the timing of starting exposure; and an end timing determination portion that determines the timing of ending exposure on the basis of the high frequency clock count value.

(3) The control circuit according to (2), wherein the high frequency clock counting unit further counts the number of clock cycles of the high frequency clock signal by using the time at which the horizontal synchronization clock count value becomes the first end set value as a starting point, and wherein the end timing determination portion sets the time at which the high frequency clock count value becomes the second end set value as the timing of ending exposure.

(4) The control circuit according to (3), wherein the horizontal synchronization clock counting unit sets the horizontal synchronization clock count value to an initial value when the horizontal synchronization clock count value becomes the first end set value.

(5) The control circuit according to any one of (1) to (4), wherein the horizontal synchronization clock counting unit sets the horizontal synchronization clock count value to an initial value in synchronization with a vertical synchronization clock signal for instructing a timing of starting an operation of the pixel group.

(6) The control circuit according to (1), further including:
a multiplication circuit that multiplies a frequency of the horizontal synchronization clock signal so as to generate the high frequency clock signal.

(7) An imaging device including:
a pixel group that is arranged in a two-dimensional lattice shape;
a horizontal synchronization clock counting unit that counts the number of clock cycles of a horizontal synchronization clock signal for instructing a timing of starting scanning pixels in a horizontal direction of the pixel group, so as to be used as a horizontal synchronization clock count value;
a high frequency clock counting unit that counts the number of clock cycles of a high frequency clock signal with a higher frequency than the horizontal synchronization clock signal, so as to be used as a high frequency clock count value; and
a timing determination unit that determines timings of starting and ending exposure for the pixels on the basis of the horizontal synchronization clock count value and the high frequency clock count value.

(8) An exposure control method including:
counting, by a horizontal synchronization clock counting unit, the number of clock cycles of a horizontal synchronization clock signal for instructing a timing of starting scanning pixels in a horizontal direction of a pixel group arranged in a two-dimensional lattice shape, so as to be used as a horizontal synchronization clock count value;
counting, by a high frequency clock counting unit, the number of clock cycles of a high frequency clock signal with a higher frequency than the horizontal synchronization clock signal, so as to be used as a high frequency clock count value; and
determining, by a timing determination unit, timings of starting and ending exposure for the pixels on the basis of the high frequency clock count value.

The present disclosure contains subject matter related to that disclosed in Japanese Priority Patent Application JP 2012-136493 filed in the Japan Patent Office on Jun. 18, 2012, the entire content of which is hereby incorporated by reference.

What is claimed is:

1. A control circuit comprising:
a horizontal synchronization clock counting unit that counts the number of clock cycles of a horizontal synchronization clock signal for instructing a timing of starting scanning pixels in a horizontal direction of a pixel group arranged in a two-dimensional lattice shape, so as to be used as a horizontal synchronization clock count value;
a high frequency clock counting unit that counts the number of clock cycles of a high frequency clock signal with a higher frequency than the horizontal synchronization clock signal, so as to be used as a high frequency clock count value; and
a timing determination unit that determines timings of starting and ending exposure for the pixels on the basis of the horizontal synchronization clock count value and the high frequency clock count value.

2. The control circuit according to claim 1, wherein the high frequency clock counting unit counts the number of clock cycles of the high frequency clock signal by using the time at which the horizontal synchronization clock count value becomes a first start set value as a starting point, and
wherein the timing determination unit includes
a start timing determination portion that sets the time at which the high frequency clock count value becomes a second start set value as the timing of starting exposure; and
an end timing determination portion that determines the timing of ending exposure on the basis of the high frequency clock count value.

3. The control circuit according to claim 2, wherein the high frequency clock counting unit further counts the number of clock cycles of the high frequency clock signal by using the time at which the horizontal synchronization clock count value becomes the first end set value as a starting point, and
wherein the end timing determination portion sets the time at which the high frequency clock count value becomes the second end set value as the timing of ending exposure.

4. The control circuit according to claim 3, wherein the horizontal synchronization clock counting unit sets the horizontal synchronization clock count value to an initial value when the horizontal synchronization clock count value becomes the first end set value.

5. The control circuit according to claim 1, wherein the horizontal synchronization clock counting unit sets the horizontal synchronization clock count value to an initial value in synchronization with a vertical synchronization clock signal for instructing a timing of starting an operation of the pixel group.

6. The control circuit according to claim 1, further comprising:
a multiplication circuit that multiplies a frequency of the horizontal synchronization clock signal so as to generate the high frequency clock signal.

7. An imaging device comprising:
a pixel group that is arranged in a two-dimensional lattice shape;
a horizontal synchronization clock counting unit that counts the number of clock cycles of a horizontal synchronization clock signal for instructing a timing of starting scanning pixels in a horizontal direction of the pixel group, so as to be used as a horizontal synchronization clock count value;
a high frequency clock counting unit that counts the number of clock cycles of a high frequency clock signal with a higher frequency than the horizontal synchronization clock signal, so as to be used as a high frequency clock count value; and
a timing determination unit that determines timings of starting and ending exposure for the pixels on the basis of the horizontal synchronization clock count value and the high frequency clock count value.

8. An exposure control method comprising:
counting, by a horizontal synchronization clock counting unit, the number of clock cycles of a horizontal synchronization clock signal for instructing a timing of starting scanning pixels in a horizontal direction of a pixel group arranged in a two-dimensional lattice shape, so as to be used as a horizontal synchronization clock count value;
counting, by a high frequency clock counting unit, the number of clock cycles of a high frequency clock signal with a higher frequency than the horizontal synchronization clock signal, so as to be used as a high frequency clock count value; and determining, by a timing determination unit, timings of starting and ending exposure for the pixels on the basis of the high frequency clock count value.

\* \* \* \* \*